Inventors
Karl A. Klingler
William O. Martin
by Parker Carter
Attorneys

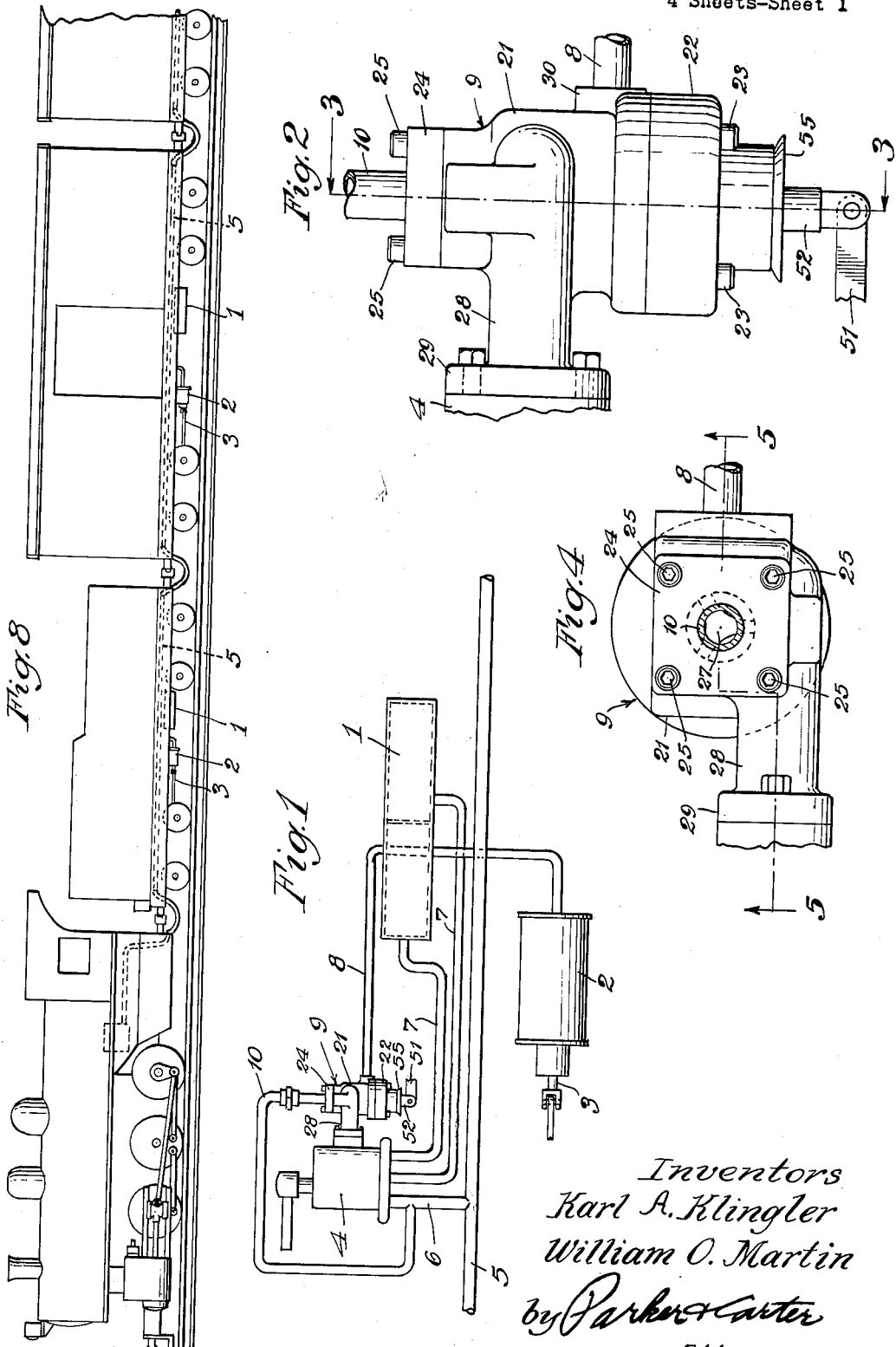

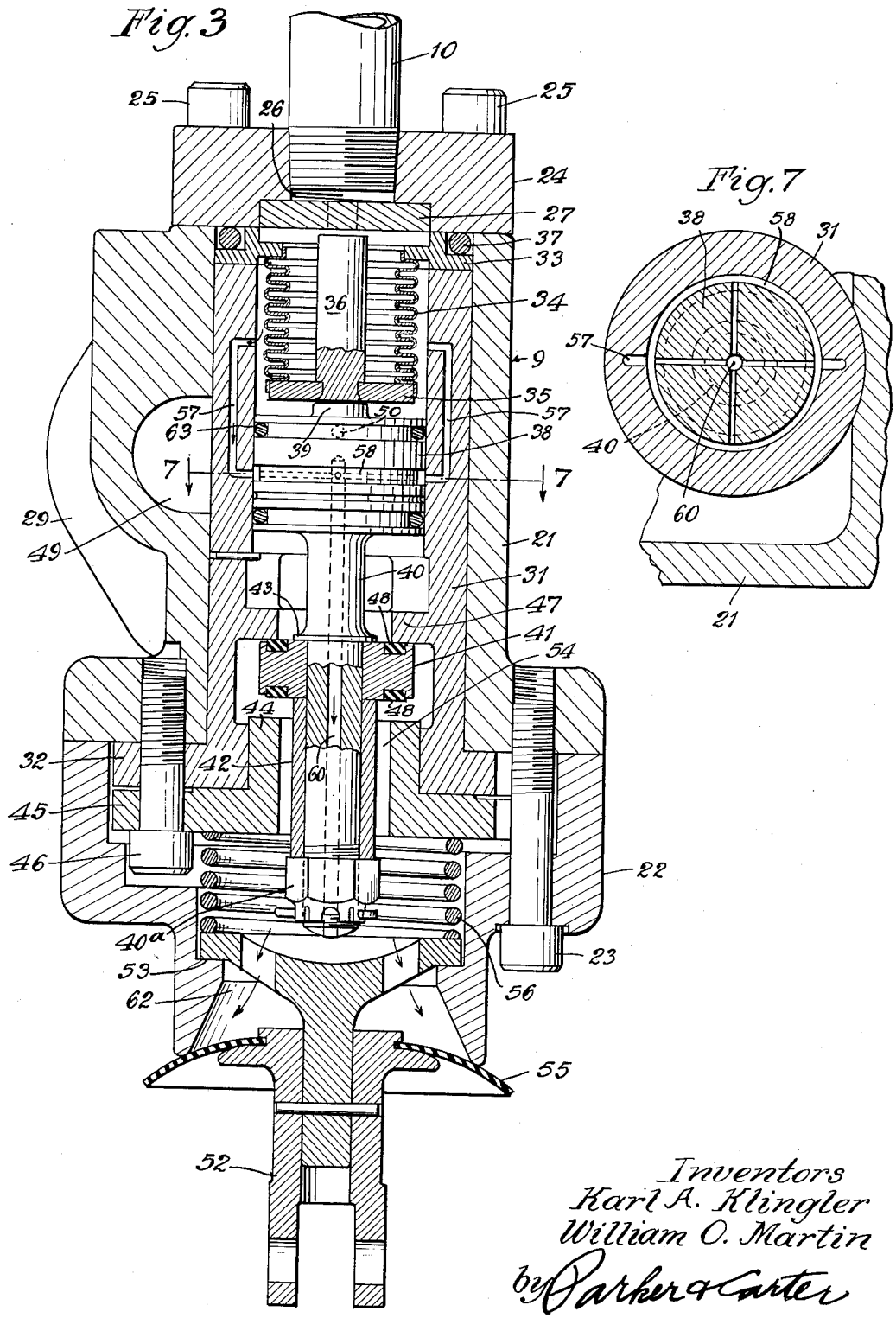

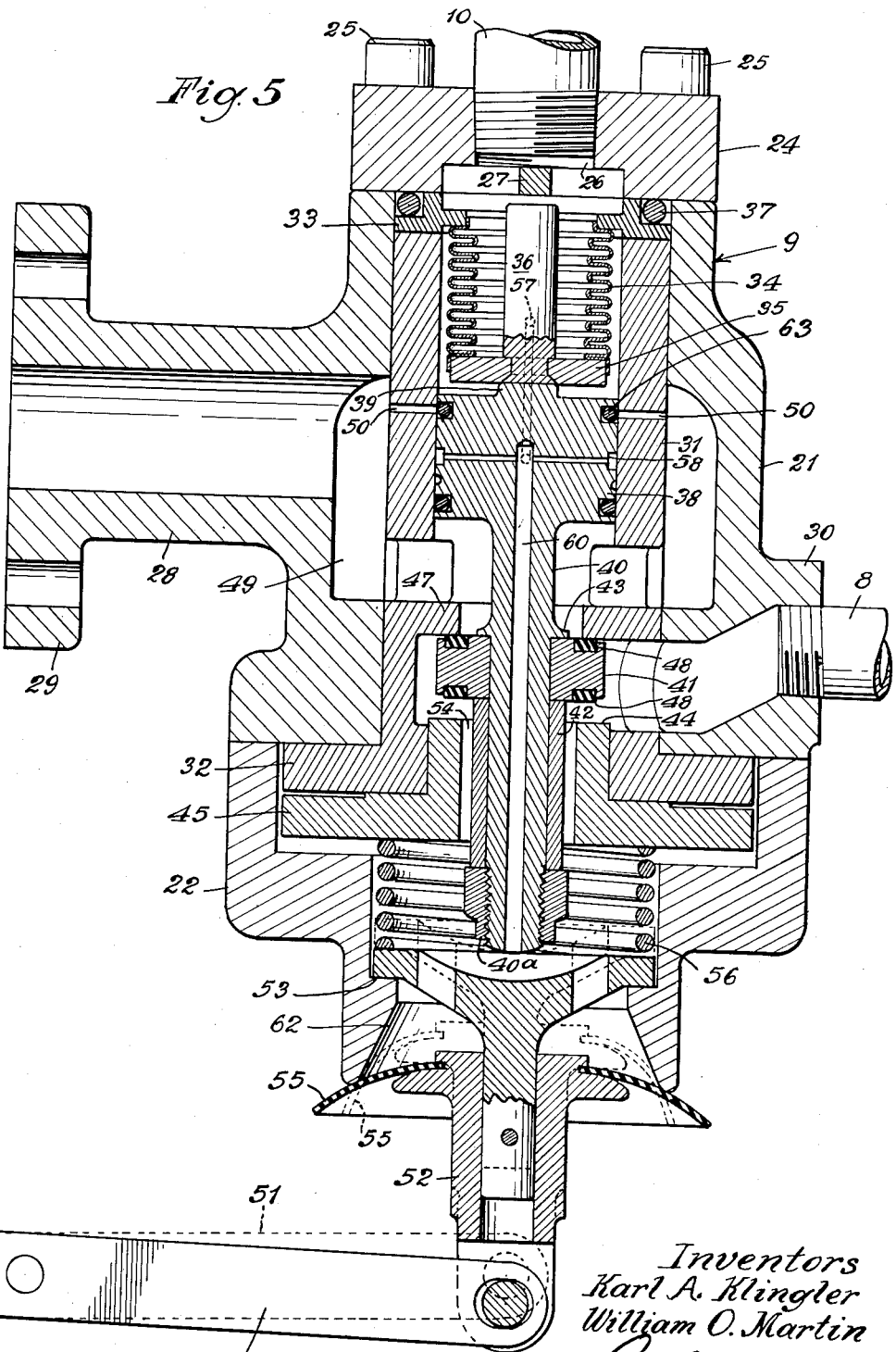

United States Patent Office 2,735,726
Patented Feb. 21, 1956

2,735,726

RAILROAD AIR VALVE

Karl A. Klingler, Naperville, Ill., and William O. Martin, Fort Smith, Ark., assignors to Crerar Adams & Co., Chicago, Ill., a corporation of Illinois Application November 28, 1951, Serial No. 258,702

2 Claims. (Cl. 303—68)

The invention relates to improvements in air brakes for railroad cars and the like and has for one object to provide an air brake control and relief valve which will, after the car has been cut out of a train, permit the brakes to be released while maintaining pressure in the auxiliary air reservoir in the car.

In general there is on each car an auxiliary reservoir for compressed air, at least one brake cylinder, and the so-called AB valve which controls brake application. The engine supplies air under pressure through the brake pipe to fill the auxiliary reservoir on each car in the train with pressure of, for example, seventy pounds per square inch. Until this has been done, the train cannot be properly operated. After each reservoir has been filled, control of pressure in the brake pipe by the engineer in the cab works through the AB valve to control brake applications.

When the pressure in the brake line for any reason falls below a predetermined point, the AB valve on each car admits pressure from the auxiliary reservoir, to the brake cylinder, to apply the brakes and hold the car in place. When it is desired to break up the train, this brake pressure must be relieved, and so a manually operated valve has in the past been provided with which the brakeman can bleed off the pressure from the auxiliary reservoir to release the brakes. The car can then be moved, but when it is again assembled in a train, time must be taken to permit air in the brake pipe to build up pressure in the auxiliary reservoirs in the train before it can be operated.

Our invention, therefore, provides a control valve assembly which makes it possible for the brakeman to release the pressure on the brake cylinder without easing the pressure in the auxiliary reservoir, so that when the car is again assembled in a train, it is ready to operate without waiting for build up of air pressure in all the reservoirs.

We accomplish this by the provision of a separate automatic control valve which may be manipulated to relieve the pressure on the brake cylinder, but which will at all times hold the pressure in the reservoir.

The invention is illustrated more or less diagrammatically in the accompanying drawings, wherein—

Figure 1 is a diagrammatic showing of the air brake piping and associated parts indicating the location of our valve;

Figure 2 is a side elevation of the valve housing;

Figure 3 is a section along the line 3—3 of Figure 2 on an enlarged scale showing the valve in the brake released position;

Figure 4 is a plan view of the valve housing;

Figure 5 is a section along the line 5—5 of Figure 4 with the valve in the same position as in Figure 3;

Figure 7 is a section along the line 7—7 of Figure 3; and

Figure 8 is a side elevation of a railroad train illustrating the application of our invention.

Like parts are indicated by like characters throughout the specification and drawings.

Figure 6:
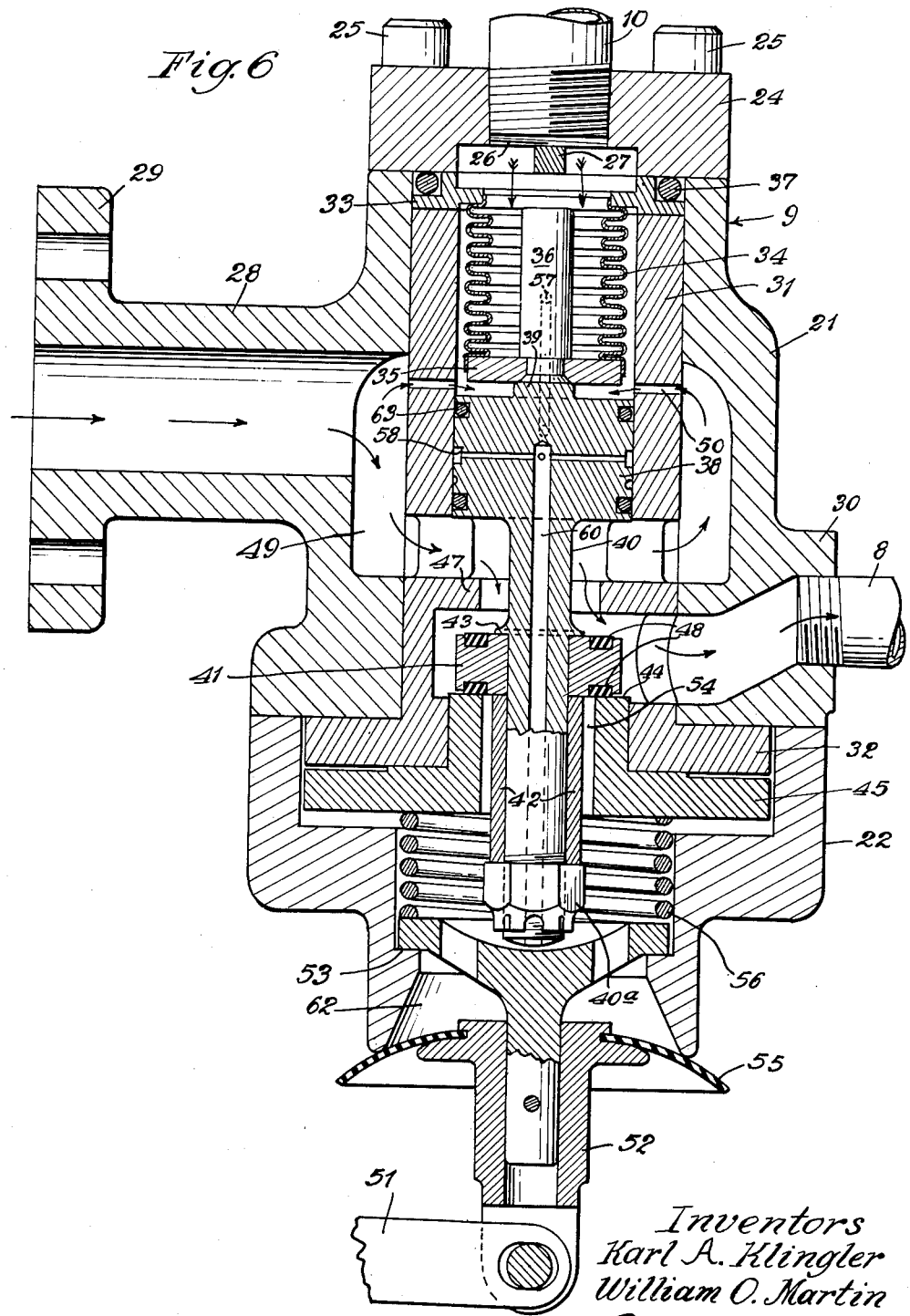
Figure 6 is a section similar to Figure 5 with the valve in position for train operation.

1 is an auxiliary air reservoir. 2 is a brake cylinder, there being at least one of each on each car. The brake cylinder contains a piston adapted to be actuated by air pressure to apply the brakes, not shown, through a brake piston rod 3. 4 is the AB valve. 5 is the train brake pipe. It extends through the train from car to car and is supplied with air from the engine. A branch pipe 6 leads from the brake pipe 5 to the AB valve 4. Our control valve is mounted on the AB valve 4 and the low pressure pipe 8 leads from the valve 9 to the brake cylinder 2. The auxiliary valve 9 controls air flow between the AB valve 4 and the brake cylinder 2 through the pipe 8. There is also a branch pipe 10 leading from the brake pipe 5 through the pipe 6 to the auxiliary valve 9. The usual two chambers in the auxiliary reservoir are separately joined to the AB valve 4 by pipes 7.

The arrangement above disclosed, except for the insertion of valve 9 between the AB valve 4 and the brake cylinder 2, and the direct connection between valve 9 and the brake pipe 5 is old.

Referring now to the details of auxiliary valve 9, 21 is the upper part of the valve housing, 22 the lower part of the valve housing. They are held together by cap screws 23. The valve housing 21 is closed at its upper end by head 24 held in place by cap screws 25. Head 24 is apertured at 26 and branch pipe 10 registers therewith. 27 is an apertured stop plate in head 24. Extending laterally from housing 21 is a high pressure connection or pipe 28 flanged at 29 to be bolted to the AB valve 4. Extending in the opposite direction from the housing 21 is a sleeve 30 in which is threaded the pipe 8 to brake cylinder 2.

Socketed in the housing 21 is a valve cage 31. It is flanged at 32 to engage the underside of the housing 21 and extends upwardly to engage annular ring 33 which forms the upper portion of the bellows 34, the lower portion of the bellows being closed by a plate 35 carrying a stop pin 36 which may engage the stop plate 27. The ring 33 is reduced in diameter immediately adjacent the head 24 to provide an annular chamber to contain a packing ring 37. Air under pressure entering through the pipe 10 into the bellows 34 may supply pressure to the plate 35 expanding the bellows downwardly. 38 is a valve actuating piston. It has a boss 39 which may engage the underside of the bellows plate 35 and a piston rod 40 which carries a valve disk 41. A spacer 42 slidable on the valve piston rod 40 holds the valve disk against the shoulder 43 by threaded connection between the nut 40a and the end of the piston rod 40. The spacer 42 is encircled by a valve seat sleeve 44 flanged at 45 socketed in the valve cage 31 and held against the flange 32 by the cap screws 46. Extending inwardly from the inner wall of valve cage 31 is a valve seat ring 47. Valve disk 41 may in its upper position engage the seat 47 and in its lower position engage the seat 44, the valve disk 41 having annular packing rings 48 of Neoprene or some similar material adapted to engage one or the other of said seats.

In Figure 3, the control valve is in the upper position for release of the car brakes. There is no pressure in branch pipe 10, but there is pressure in the chamber 49 which chamber communicates by the connection 28 with the AB valve 4, the AB valve being so disposed that pressure from the reservoir 1 is applied to the chamber 49. The pressure in the chamber 49 is thus applied to the underside of the piston 38 and to the upper side of the valve disk 41. The respective areas of the piston and valve disk thus exposed to pressure are such that since the area in piston 38 is greater than the area in valve 41, the piston is held in the upper position and air cannot escape from the auxiliary reservoir 1 through the AB valve 4 through the auxiliary valve 9 to the atmosphere, but the connection between the auxiliary reservoir 1 and the brake cylinder 3 is closed so the brakes are off.

When the car is coupled into a train, as in Figure 6, air pressure will be supplied through branch pipe 10 to the bellows 34. This pressure will be in the order of seventy pounds to the square inch, pressure in the reservoir being in the order of seventy pounds to the square inch, and this pressure will cause the bellows 34 to expand and move the piston 38 and the valve 41 into the lower position.

This downward movement of the bellows and the piston 38 will uncover the air passages 50 so that air under pressure from the chamber 49 passes through the wall of the valve cage 31 into the area above the piston and furnishes additional air pressure to hold the valve 41 against the lower seat 44, because seventy pounds pressure is applied to the upper side of the bellows bottom, thirty-five and fifty pounds pressure applied to the top of the piston 38 and the underside of the bellows plate 35, but the cross sectional area of the plate 35 is less than the cross sectional area of the piston 38 so that there is a differential pressure available to assist the bellows pressure in holding the piston in its down position.

When the piston 38 is held in its down position, a passage is open between the AB valve 4 and the brake cylinder 2 through the auxiliary valve 9, and under these circumstances, the engineer controls train operation through the AB valve just as if auxiliary valve 9 were not present.

When the train is to be broken up, pressure in the brake pipe will be relieved, and there will be no pressure in the bellows. The pressure on the underside of the piston 38 will still be counterbalanced by the pressure on the upper side of the valve actuating piston 38, owing to the fact that the passage 50 still connects the chamber 49 and the upper side of the piston. Thus an air passage from the AB valve 4 through the auxiliary valve 9 to the brake cylinder 2 remains open, and the brakes are still under control of the AB valve 4 and kept applied by pressure from the auxiliary reservoir 1.

When the brakeman desires to move the car, he breaks the coupling between the train pipe line on the car in question and the other cars. This has no effect because there was no pressure on the brake pipe. He then pulls on the linkage 51 which is pivoted on the lever 52. The lever 52 is fulcrumed at 53, and so rotation of the lever causes it to engage the under end of the piston rod 40, moving the piston rod, the valve 41, and the piston 38 into the upper position. Under these circumstances, with the valve 41 engaging the upper seat, air escapes from the brake cylinder through pipe 8, connection 30, clearance 54, past lever 52, past the flexible sealing plate 55 to atmosphere.

The spring 56 has as its sole function, to hold the lever on its seat. It has nothing to do with the operation of the auxiliary valve. When the lever 52 rocked and pressure is released from the brake cylinder 2 and the piston 38 is moved up, the air trapped above the piston 38 escapes through the ducts 57 in the wall of the cage 31, in register with the annular groove 58 in the piston 38, thence through axial passage 60 in valve piston rod 40 to atmosphere, through the release chamber 62 in which the lever 52 is located. At the same time, such upward movement of the piston causes the packing ring 63 to close the duct 50 so that air under pressure cannot reach the upper side of the piston 38. With the piston in the upper position, air pressure on the underside of the piston overcomes the pressure on the upper face of the valve plate 41, and so air is held in the system by the valve 41 in its seated position. When air is again applied to the train pipe, the sequence of operations above discussed occur.

The pipe or connection 28 leading to the AB valve is an intake passage through which air comes from the AB valve. The pipe 8 is a discharge passage. The passage or clearance 54 serves as the vent or relief passage from the low pressure chamber on the underside of the valve seat 47. The high pressure chamber is the chamber 49. The intake passage 28 can equally well be described as the supply passage.

The use and operation of our invention are as follows:

When air is applied to the brake pipe, the auxiliary valve automatically opens a passage between the AB valve and the brake cylinder so that the engineer is able to control the train in the usual manner, just as if the auxiliary valve was not in existence. Under these circumstances, changes in the pressure of the air in the train pipe line brought about by the engineer so as to cause the AB valve to control brake operation do not upset in any way the setting of the auxiliary valve. The auxiliary valve maintains a clear passage for air between the AB valve and the brake cylinder.

When pressure is released entirely from the train brake lines, the auxiliary valve remains in place, permitting continued brake application by the AB valve of the air under pressure in the reservoir.

When it is desired to move the car, a manipulation of the release lever unseats the auxiliary valve to break the connection between the AB valve and the brake cylinder, but does not permit escape of air from the reservoir through the AB valve to atmosphere. It makes no difference how often the releasing lever is operated, because once it has been operated to move the valve into the position disconnecting the AB valve and the brake cylinder, nothing can happen at the car to change that situation. The only thing that would change the situation would be application of pressure again to the brake pipe.

If by accident the release lever should be manipulated while pressure was on the brake pipe there would be an escape of air, but when the lever is released, the valve resumes its operating position and the brake system would operate as before.

Under these circumstances, there is no possibility of air being lost from the reservoir while the car is not connected with the train, but when the car is connected in the train with the engine, the operation is just as if the auxiliary valve were not in existence. Nothing can happen to the auxiliary valve to apply the brakes and the auxiliary valve is normally in the position where the AB valve can apply the brakes. The release valve is altogether separate from the AB valve. There is a separate connection between the release valve and the train pipe and a direct passage through a valve controlled port from the connection between the release valve and the AB valve to the connection between the release valve and the brake cylinder.

There is a single longitudinally movable integral piston and valve member socketed in the release valve housing. Air pressure from the train pipe independent of the AB valve holds the release valve in such position that the free passage between the AB valve and the brake cylinder is not interrupted. There is a vent in the release valve housing which is closed by the piston valve under these circumstances. The actuating piston is exposed on both sides to the pressure from the AB valve and on the side to seat the valve to close the vent. It is also exposed to train pipe pressure which holds it seated.

When train pipe pressure is relieved because the car is disconnected from the train, air pressure from the AB valve balanced on both sides of the piston leaves the relief valve seated and pressure remains on the brake cylinder.

If the brakeman wants to move the car, he actuates the rock or toggle member to manually mechanically displace the valve and piston against AB valve pressure. The minute he does this, the release port opens and the brake cylinder exhausts to atmosphere. At the same time the release valve closes the passage between the brake cylinder and the vent and the AB valve. The upward movement of the piston uncovers a port so that pressure above the piston also exhausts to the outside air but pressure from the AB valve on the underside of the piston holds the valve closed, the valve having smaller cross sectional area than the piston. Thus the pressure from the AB valve holds the release valve in the brake cylinder release, reservoir closing position. The car can then be moved but no further air is lost through the AB valve and no manipulation of the mechanical piston and valve displacement means affects the valve.

When pressure is put on the train pipe again, this pressure overcomes the pressure from the AB valve, closes the vent, opens the connection from the AB valve to the brake cylinder.

If the manual displacing member is locked open, no air reaches the brake cylinder but when it is locked open it closes off the air discharged from the release valve and holds air in the AB valve system.

This is all accomplished with a single moving part. The piston opens and closes the necessary ports to permit venting of the piston itself and to permit balancing of pressures above and below the piston. The valve carried by the piston is a two-way valve, in one position it closes the vent and in another position it opens the vent and closes the connection between the AB valve and the brake cylinder.

With the air brake system in running condition, pressure in the brake pipe 5 having built up the pressure in the reservoirs on each car, there is a balance of pressure between the reservoirs and the brake pipe and the AB valve is in release condition. Under these circumstances, there is no pressure on the air brake control and relief valve, the pressure in the pipe 28 being at atmospheric.

When the train brakes are applied, pressure in the train brake pipe 5 is reduced. Under these circumstances, pressure in the pipe 10 is reduced and then the pressure in the auxiliary reservoir exceeds the pressure in the brake pipe 5 which actuates the AB valve and applies the brake by making a connection through our valve from the auxiliary reservoir to the brake cylinder to apply the brakes.

As long as there is any pressure in the train brake pipe 5, there is always pressure in the pipe 10 and in the bellows 34 so that the valve 48 is always forced by such pressure down against its seat, as in Figure 6. Under these circumstances, there can be no continuing unintended operation of the brake because if the lever 52 should be manipulated, the minute it is let go the pressure in valve pipe 10 immediately resets the valve 48.

The above arrangement insures automatic operation. When the pressure drops in the train brake pipe 5, for example when a car is disconnected from the train, the pressure in the auxiliary reservoir actuates the AB valve to open the connection between the reservoir and the brake cylinder. The brake is applied and remains applied under the pressure of the auxiliary reservoir. When it is desired to move the car, the operator manipulates the lever 51 so that our valve assumes the position of Figure 5, releasing the pressure on the brake cylinder, but closing off any escape of pressure from the auxiliary or emergency reservoir.

The air pressure does this work without relying on springs or special valve ports or any special adjustments and when the car is coupled back into the train and pressure is applied to the pipe 5, our valve is returned to the position of Figure 6, no further action being required by the train crew or any one else. This avoids the dangerous possibility of starting the car in a train with the bleeder valve open and no brakes on the car.

Considering Figure 6, our valve is in the train operating position, the valve 48 seats on the seat 44 to provide an unobstructed passage between the brake cylinder and the reservoirs through the AB valve and our valve. The bypass 50 allows air under pressure to enter the space above the piston 38 so that the pressure from the pipe 10 and the pressure entering from the connection 28 both unite to hold the valve 48 in the train operating position.

Piston 38 is of larger cross-sectional area than the exposed portion of valve 41 so, since pressure is balanced both above and below the piston 38 by air entering through the AB valve, there is no tendency for piston 38 to rise and the pressure on valve 41 exerted by the air in the brake cylinder insures that valve 41 will remain in the train operating position of Figure 6. When the pressure in pipe 10 drops and the operator manipulates the lever 51 to raise the valve 48 to the position of Figure 5, then the pressure above the piston 38 is shut off and pressure is only on the underside of piston 38 and the valve remains in the position of Figure 5. Under these circumstances, the pressure in piston 38 bleeds out through passage 60. This situation continues until pressure is again felt on pipe 10.

The importance of the bellows 34 is that it can be made air-tight without substantial friction loss; leakage from pipe 10 does not occur; and pressure will always be maintained in the bellows when pressure is on pipe 10 to hold the valve in the position of Figure 6, or to return the valve to the position of Figure 6 except when it is held manually open.

We claim:

1. In combination, a train pipe adapted to contain, at one time, air above, and at another time, air at atmospheric pressure, an AB valve connected to the train pipe, an air pressure reservoir connected to the train pipe through the AB valve, a brake cylinder connected to air pressure reservoir through the AB valve, a control valve housing connected to the AB valve and providing communication betwee nthe AB valve and the brake cylinder, a direct connection between the train pipe and the control valve housing independent of the AB valve, a single free piston mounted to reciprocate in the control valve housing, an exhaust port in the control valve housing adapted to discharge to atmosphere, a valve member actuated by the piston, adapted in one position to close the exhaust port and open communication between the AB valve and the brake cylinder and in another position to close communication between the AB valve and the brake cylinder and open the exhaust port permitting air from brake cylinder to discharge to atmosphere, means subject to train pipe pressure for moving the piston to exhaust-port closing position, said control valve housing including port means for applying balancing AB pressure to opposite ends of the piston when the valve member is in exhaust-port closing position, manual means for positively moving the piston and valve to exhaust port open position, in which communication between the AB valve and the brake cylinder is closed, said control valve housing including piston controlled port means for venting the AB pressure from the top of the piston when the latter is moved to exhaust-port open position, while maintaining the underface of the piston to AB pressure to hold the valve in exhaust-port open position while sealing the control valve housing against loss of AB pressure.

2. The apparatus described in claim 1 wherein said means subject to train pipe pressure includes an expansible bellows member having its interior in communication with train pipe pressure through said direct connection, said bellows member including means operatively connected to said piston to control valve actuating movements thereof.

References Cited in the file of this patent

UNITED STATES PATENTS

| | | |
|---|---|---|
| 2,287,775 | Baker et al. | June 30, 1942 |
| 2,322,823 | Brown | June 29, 1943 |
| 2,350,242 | McAlpine | May 30, 1944 |
| 2,392,185 | Pickert | Jan. 1, 1946 |
| 2,402,317 | DuBois | June 18, 1946 |
| 2,476,054 | Loweke | July 12, 1949 |